(No Model.) 2 Sheets—Sheet 1.

W. E. DANIELS.
APPARATUS FOR CUTTING AND GROOVING FABRICS.

No. 357,583. Patented Feb. 15, 1887.

Witnesses:
C. S. Gooding
H. S. Robinson

Inventor:
William E. Daniels
by his Attorney

UNITED STATES PATENT OFFICE.

WILLIAM E. DANIELS, OF SOMERVILLE, MASSACHUSETTS.

APPARATUS FOR CUTTING AND GROOVING FABRICS.

SPECIFICATION forming part of Letters Patent No. 357,583, dated February 15, 1887.

Application filed January 18, 1886. Serial No. 183,849. (No model.)

*To all whom it may concern:*

Be it known that I, WILLIAM E. DANIELS, of Somerville, in the county of Middlesex and State of Massachusetts, have invented certain new and useful Improvements in Apparatus for Cutting and Grooving Fabrics, of which the following, taken in connection with the accompanying drawings, is a specification.

The object of this invention is to provide simple apparatus for automatically measuring and conveniently cutting off lengths of any sheeted fabric, and at the same time of grooving the cut piece, if desired, preparatory to forming a hem thereon.

My special purpose in this improvement is to simplify and facilitate cutting and hemming hollands and like rolled fabrics in the manufacture of window-shades.

My invention consists, generally, in a stationary bed over which the fabric is drawn, and a rotating cutter having a weighted body arranged to traverse said bed while resting on the fabric to hold it firmly near the cutting-point. Suitable guides or ways are provided to keep the cutter in its proper path, with handles to reciprocate it. Ribs on the bed and grooves in the periphery of the cutter-body keep the cutter in its true path, serve to locate the hem on the fabric, and facilitate folding the same. A cross wire or rod keeps the end of the goods from which a length has been severed from rolling up again. An automatic device for indicating the successive cutting-points is provided.

Figure 1:
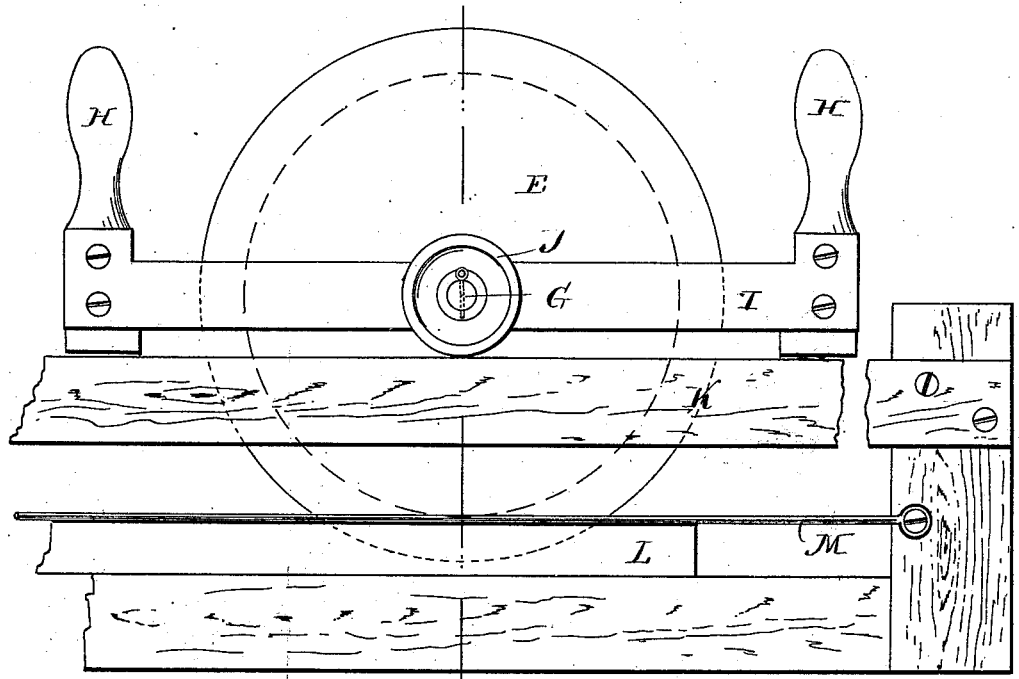
Figure 2:
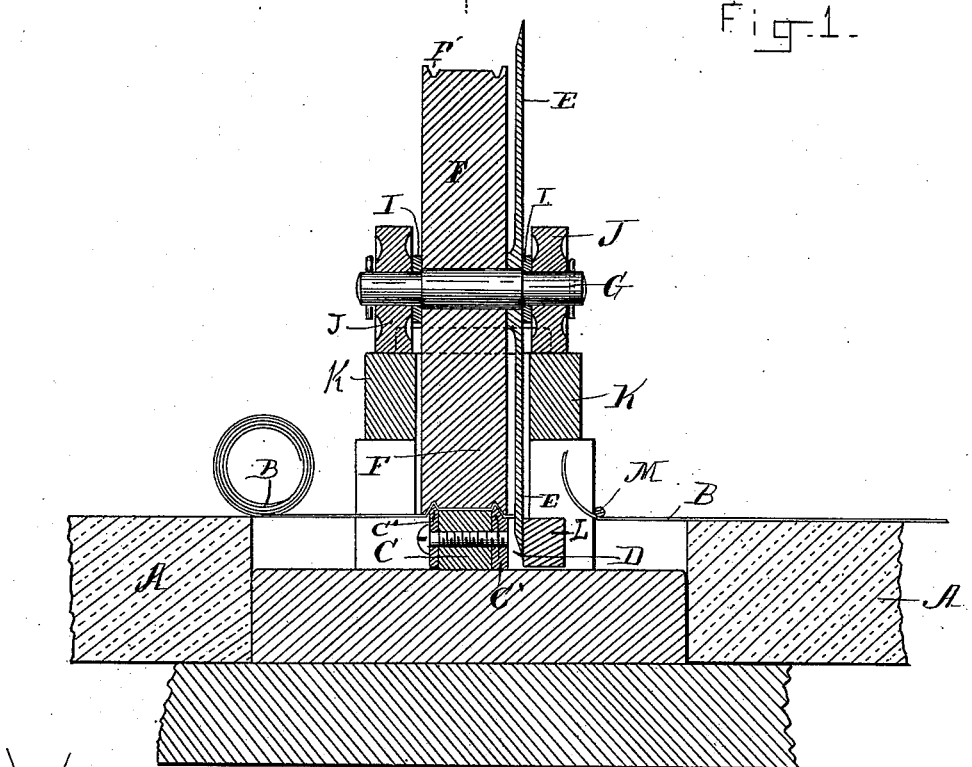
Figure 3:
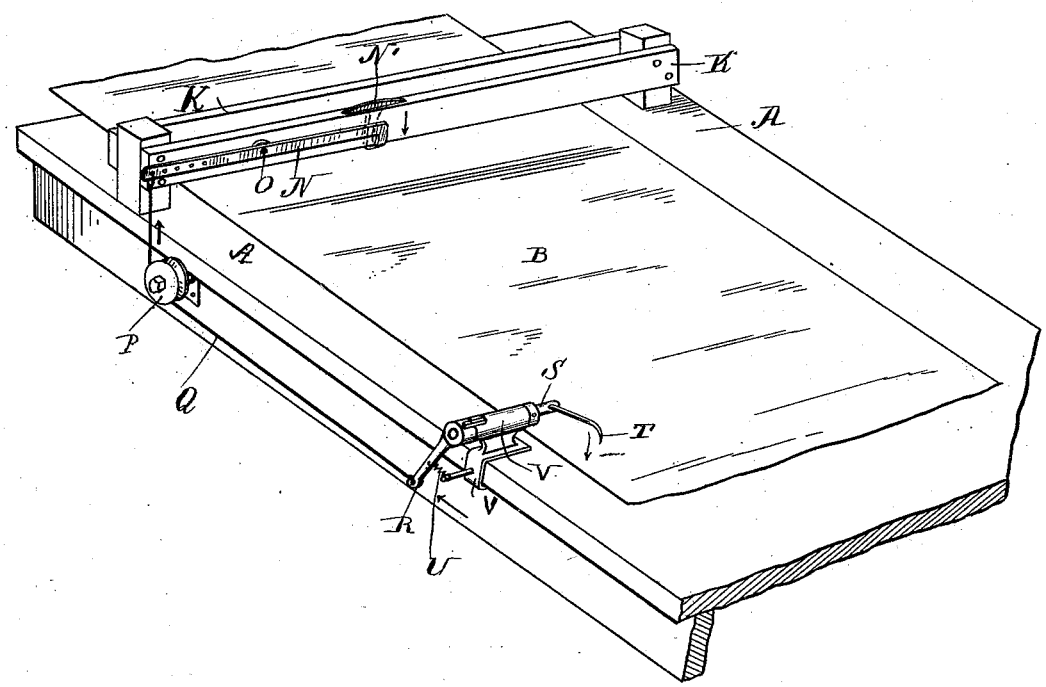

In the drawings, Figure 1 is a front elevation of my apparatus, showing parts broken away. Fig. 2 is a vertical central section thereof. Fig. 3 represents in perspective a suitable adjustable measuring apparatus for use with my cutting and creasing mechanism. The bed may be sunken to the level of the table-top in a permanent structure or raised to a higher plane in a portable or temporary apparatus.

A represents the table on which the shade B or other fabric to be cut rests when drawn out from the roll. Near one end of and transverse to the table my cutting mechanism is placed, either temporarily or permanently.

C is the bed, preferably about level with the table, so that the fabric may be drawn over and rest upon it, and D is a slot lengthwise of the bed for the cutter to traverse.

E is the cutter—a sharp rotary blade fixed to a heavy cylindrical body, F, arranged to travel forward and back over the bed C while resting on the fabric B, drawn out on the table A, and across the track or bed. The bed C thus serves as a guide rail or track for the cylinder which carries the cutter, and will guide the roller F and its cutter in its predetermined line, even if bars K K be omitted.

G is the axis of the cutter E and roller F, to which power is applied by means of handles H and connecting-strips I to cause the cutter to traverse the bed. I usually provide wheels J, mounted on the axle-journals, and each resting on side rails, K, as supports or guides for the revolving cutter.

The rotary cutter is of greater diameter than the weighted roller F, with which it revolves, and consequently it moves with a drawing stroke through the fabric being cut as the roller advances. The cutter runs in the slot D in close proximity to the bar L, fixed in position parallel to the bed C. The fabric, drawn over this bar and held by the weight of the roller F near the cutting-point, is readily severed on the line desired. A wire, M, stretched from end to end of the frame parallel to the bed, keeps the end of the piece of goods from which a shade length has been cut from rolling up again, as indicated on the right side of Fig. 2. The roll B on the left of said figure represents a length cut off and and nearly rolled up for removal as soon as the roller F passes off of it.

It is customary to form a hem at the foot of the shade to receive the shade-stick. In order to locate this hem at the proper distance from the end, and to facilitate folding the goods along the desired lines, I form the bed C with raised longitudinal ribs C′, preferably made separate and bolted on, and I groove the periphery of the roller F, as at F′, to fit upon such ribs. The folding of the hem is thus initiated simultaneously with the severing of each length, so that the shade is ready for the sewing-machine to stitch the hem without further labor.

I combine with this cutting apparatus an automatic marking device actuated during each traversing movement of the cutter across the bed, to indicate the proper cutting-point for a given length of shade. A simple means for this purpose is represented in Fig. 3, and in practice is found to work satisfactorily; but it is obvious some other device may be readily substituted therefor, and hence I do not limit myself to this construction.

One of the side rails K has a lever, N, pivoted on it at O. Midway of this rail the end of this lever is raised somewhat above the upper surface of the rail through a slot, and preferably beveled each way from the center, as at N', so that in moving either way one of the wheels J will pass over the projection N' and slightly depress it. This lifts the outer end of the lever and draws upwardly on the cord Q, which passes around or beneath the grooved pulley P, and thence to the arm R. This arm projects from a short rock-shaft, S, having at its inner end a pointed finger, T, which, by a slight pull on the cord Q, is thrown down onto the shade, making a small perforation in it at the desired distance from the preceding cut, thus showing the precise point for the next one. The finger T is raised from the shade, and the lever projection N' again elevated by a suitable spring, U.

The shaft S is journaled in a movable bracket, V, fixed adjustably in position on the edge of the table by a clamp-screw or otherwise. I thus provide for marking off any desired length of shade by varying the length of the cord Q and sliding the bracket accordingly.

I claim as my invention—

1. The table A, having the guideway or track C thereon, the roller F, resting on said track, and the knife E, attached to said roller and working in a groove alongside the track C, substantially as described.

2. The bed C, arranged crosswise of the table A, and the roller F and circular cutter E, adapted to traverse the bed, in combination with the side rails, K, on either side of the roller and cutter, and with the wheels J, journaled on the axis G and traversing the rails K, substantially as set forth.

3. The bed C, having the raised ribs C' and adjacent slot D, in combination with the roller F, grooved to fit upon said ribs, and with the circular cutter E, of greater diameter than said roller and projecting into said slot, substantially as and for the purposes set forth.

4. The table A, transverse bed C, and weighted cutter traveling thereon, in combination with a marking device automatically actuated by the movement of the cutter to mark off a given length on the fabric, substantially as set forth.

5. The table A, bed C, and side rails, K, parallel to the bed, in combination with the pivoted lever N N', pulley P, cord Q, adjustable bracket V, and vibrating finger T, substantially as set forth.

In testimony whereof I have signed my name to this specification, in the presence of two subscribing witnesses, on this 19th day of December, A. D. 1885.

WILLIAM E. DANIELS.

Witnesses:
A. H. SPENCER,
E. W. KINDRED.